US012473856B2

United States Patent
Cocks et al.

(10) Patent No.: US 12,473,856 B2
(45) Date of Patent: *Nov. 18, 2025

(54) CRACKING AND SEPARATION OF AMMONIA FUEL

(71) Applicant: RTX CORPORATION, Farmington, CT (US)

(72) Inventors: Peter Cocks, South Glastonbury, CT (US); Lance Smith, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,890

(22) Filed: May 15, 2024

(65) Prior Publication Data

US 2024/0301818 A1    Sep. 12, 2024

Related U.S. Application Data

(62) Division of application No. 16/953,566, filed on Nov. 20, 2020, now Pat. No. 12,006,865.

(51) Int. Cl.
*F02C 3/22*     (2006.01)
*C01B 3/04*     (2006.01)
(Continued)

(52) U.S. Cl.
CPC ............... *F02C 3/22* (2013.01); *C01B 3/047* (2013.01); *B01D 2256/16* (2013.01);
(Continued)

(58) Field of Classification Search
CPC ............ C01B 3/047; C01B 2203/0266; C01B 2203/0277; C01B 2203/041; B01D 2256/16; F02C 3/20; F02C 3/22
See application file for complete search history.

(56) References Cited

U.S. PATENT DOCUMENTS 3,049,872 A    8/1962    Johnson et al.
3,313,103 A    4/1967    Johnson
(Continued)

FOREIGN PATENT DOCUMENTS

JP    6769856 B2    10/2020
WO    2019204857 A1    10/2019
WO    2020217998 A1    10/2020

OTHER PUBLICATIONS

Partial European Search Report for European Application No. 21209416.3 mailed Jul. 12, 2022.
(Continued)

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A gas turbine engine includes a cracking device that is configured to decompose an ammonia flow into a flow that contains more hydrogen ($H_2$) than ammonia ($NH_3$), a first separation device that separates hydrogen downstream of the cracking device, wherein residual ammonia and nitrogen are exhausted as a residual flow. The separated flow contains more hydrogen than ammonia, and nitrogen is exhausted separately as a hydrogen flow. A combustor is configured to receive and combust the hydrogen flow from the separation device to generate a gas flow. A compressor section is configured to supply compressed air to the combustor. A turbine section is in flow communication with the gas flow produced by the combustor and is mechanically coupled to drive the compressor section.

14 Claims, 3 Drawing Sheets

(51) Int. Cl.
*F02C 3/20* (2006.01)
*F02C 7/22* (2006.01)
*F02C 7/224* (2006.01)
*F02C 9/40* (2006.01)
*F23R 3/40* (2006.01)

(52) U.S. Cl.
CPC ........... *C01B 2203/0266* (2013.01); *C01B 2203/0277* (2013.01); *C01B 2203/041* (2013.01); *F02C 3/20* (2013.01); *F02C 7/22* (2013.01); *F02C 7/224* (2013.01); *F02C 9/40* (2013.01); *F23R 3/40* (2013.01)

(56) References Cited

U.S. PATENT DOCUMENTS

| | | |
|---|---|---|
| 5,394,685 A | 3/1995 | Kesten et al. |
| 10,478,805 B2 | 11/2019 | Hinokuma et al. |
| 10,753,276 B2 | 8/2020 | Bulat et al. |
| 2008/0241033 A1 | 10/2008 | Nazri |
| 2010/0212323 A1* | 8/2010 | Martin ............ F23R 3/286 60/752 |
| 2011/0011354 A1* | 1/2011 | Dincer ............ C01B 3/047 123/3 |
| 2013/0243660 A1 | 9/2013 | Kim et al. |
| 2014/0356738 A1 | 12/2014 | Bell et al. |
| 2018/0283271 A1 | 10/2018 | Pomar |
| 2019/0039887 A1 | 2/2019 | Li et al. |
| 2020/0032676 A1 | 1/2020 | Nose et al. |
| 2020/0158016 A1* | 5/2020 | Dardas ............ F02C 7/232 |
| 2022/0099021 A1 | 3/2022 | Uechi et al. |
| 2022/0127142 A1 | 4/2022 | Hill et al. |
| 2022/0154646 A1* | 5/2022 | Araki ............ C01B 3/047 |
| 2022/0193629 A1 | 6/2022 | Kambara et al. |

OTHER PUBLICATIONS

Extended European Search Report for European Application No. 24214649.6 mailed Apr. 11, 2025.

* cited by examiner

CRACKING AND SEPARATION OF AMMONIA FUEL

CROSS-REFERENCE TO RELATED APPLICATIONS

This application is a Divisional of U.S. patent application Ser. No. 16/953,566 filed on Nov. 20, 2020.

BACKGROUND

A gas turbine engine typically mixes a carbon based fuel with air within a combustor where it is ignited to generate a high-energy exhaust gas flow. The high-energy exhaust gas flow includes carbon that is eventually exhausted into the environment. Alternative engine structures and fuels may aid in the reduction and/or elimination of carbon emissions. One such alternative fuel is ammonia.

Turbine engine manufacturers continue to seek further improvements to engine performance including improvements to reduce environmental impact while improving propulsive efficiencies.

SUMMARY

A gas turbine engine according to an exemplary embodiment of this disclosure includes a cracking device that is configured to decompose an ammonia flow into a flow that contains more hydrogen (H2) than ammonia (NH3), a first separation device that separates hydrogen downstream of the cracking device, wherein residual ammonia and nitrogen are exhausted as a residual flow. The separated flow contains more hydrogen than ammonia, and nitrogen is exhausted separately as a hydrogen flow. A combustor is configured to receive and combust the hydrogen flow from the separation device to generate a gas flow. A compressor section is configured to supply compressed air to the combustor. A turbine section is in flow communication with the gas flow produced by the combustor and is mechanically coupled to drive the compressor section.

In a further embodiment of the foregoing, the separation device includes a selectively permeable membrane that provides separation of hydrogen from ammonia and nitrogen.

In a further embodiment of the foregoing, the cracking device and the first separation device are combined in one device.

In a further embodiment of the foregoing, the gas turbine engine further includes a second separation device downstream of the first separation device. The second separation device is configured to separate ammonia from hydrogen and nitrogen and communicates the separated ammonia to a fuel storage tank.

In a further embodiment of the foregoing, the gas turbine engine further includes a hydrogen compressor that is configured to receive the hydrogen flow from the first separation device. The hydrogen compressor is configured to increase a pressure of the hydrogen flow and communicate the pressurized hydrogen flow to the combustor.

In a further embodiment of the foregoing, the gas turbine engine further includes a turboexpander that is configured to receive the residual flow from the first separation device. The residual flow is expanded through the turboexpander to drive a mechanical output.

In a further embodiment of the foregoing, the gas turbine engine further includes a second separation device that is configured to receive the residual flow that is exhausted from the turbo-expander. The second separation device is configured to separate ammonia from hydrogen and nitrogen and communicate the separated ammonia to a fuel storage tank.

In a further embodiment of the foregoing, the second separation device is configured to communicate hydrogen and nitrogen separated from ammonia to the combustor.

In a further embodiment of the foregoing, the gas turbine engine further includes a pump that is configured to increase a pressure of the ammonia flow to a pressure above 5 atm (74 psi) at the cracking device.

In a further embodiment of the foregoing, the gas turbine engine further includes a thermal transfer device that is configured to heat the ammonia fuel flow for decomposition of the ammonia flow in the cracking device.

A fuel system for a gas turbine engine according to an exemplary embodiment of this disclosure includes a fuel storage device that is configured to store an ammonia fuel, a pump that is configured to increase a pressure of the ammonia flow to a pressure above 1 atm (74 psi), a thermal transfer device that is configured to heat the ammonia flow to a temperature above 500° C. (932° F.), a cracking device that is configured to decompose an ammonia flow into a flow that contains more hydrogen (H2) than ammonia (NH3), and a first separation device that is configured to separate hydrogen downstream of the cracking device, wherein residual ammonia and nitrogen are exhausted as a residual flow. The separated flow contains more hydrogen than ammonia, and nitrogen is exhausted separately as a hydrogen flow and is communicated to a combustor.

In a further embodiment of the foregoing, the cracking device and the first separation device are combined in one device.

In a further embodiment of the foregoing, the fuel system further includes a second separation device that is downstream of the first separation device. The second separation device is configured to separate ammonia from hydrogen and nitrogen and communicate the separated ammonia to a fuel storage tank.

In a further embodiment of the foregoing, the fuel system further includes a turboexpander that is configured to receive the residual flow from the first separation device, wherein the residual flow is expanded through the turboexpander to drive a mechanical output.

In a further embodiment of the foregoing, the fuel system further includes a second separation device that is configured to receive the residual flow that is exhausted from the turbo-expander. The second separation device is configured to separate ammonia from hydrogen and nitrogen and communicate the separated ammonia to a fuel storage tank.

A method of operating a gas turbine engine according to an exemplary embodiment of this disclosure includes decomposing an ammonia fuel flow with a cracking device into a flow containing more hydrogen (H2) than ammonia (NH3), removing hydrogen downstream of the cracking device with a first separation device, and communicating the flow that contains more H2 to a combustor that is configured to generate a gas flow.

In a further embodiment of the foregoing, the method further includes heating the ammonia flow with thermal energy that is communicated from a heat source of the gas turbine with a thermal transfer device.

In a further embodiment of the foregoing, the method further includes expanding a residual flow from the first separation device using a turboexpander to drive a mechanical output.

In a further embodiment of the foregoing, the method further includes removing ammonia from a flow that is exhausted from the turboexpander in a second separation device, communicating separated ammonia to a fuel storage tank and communicating hydrogen and nitrogen to the combustor.

In a further embodiment of the foregoing, the method further includes increasing a pressure of the flow that is communicated from the first separation device to the combustor with a hydrogen compressor.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
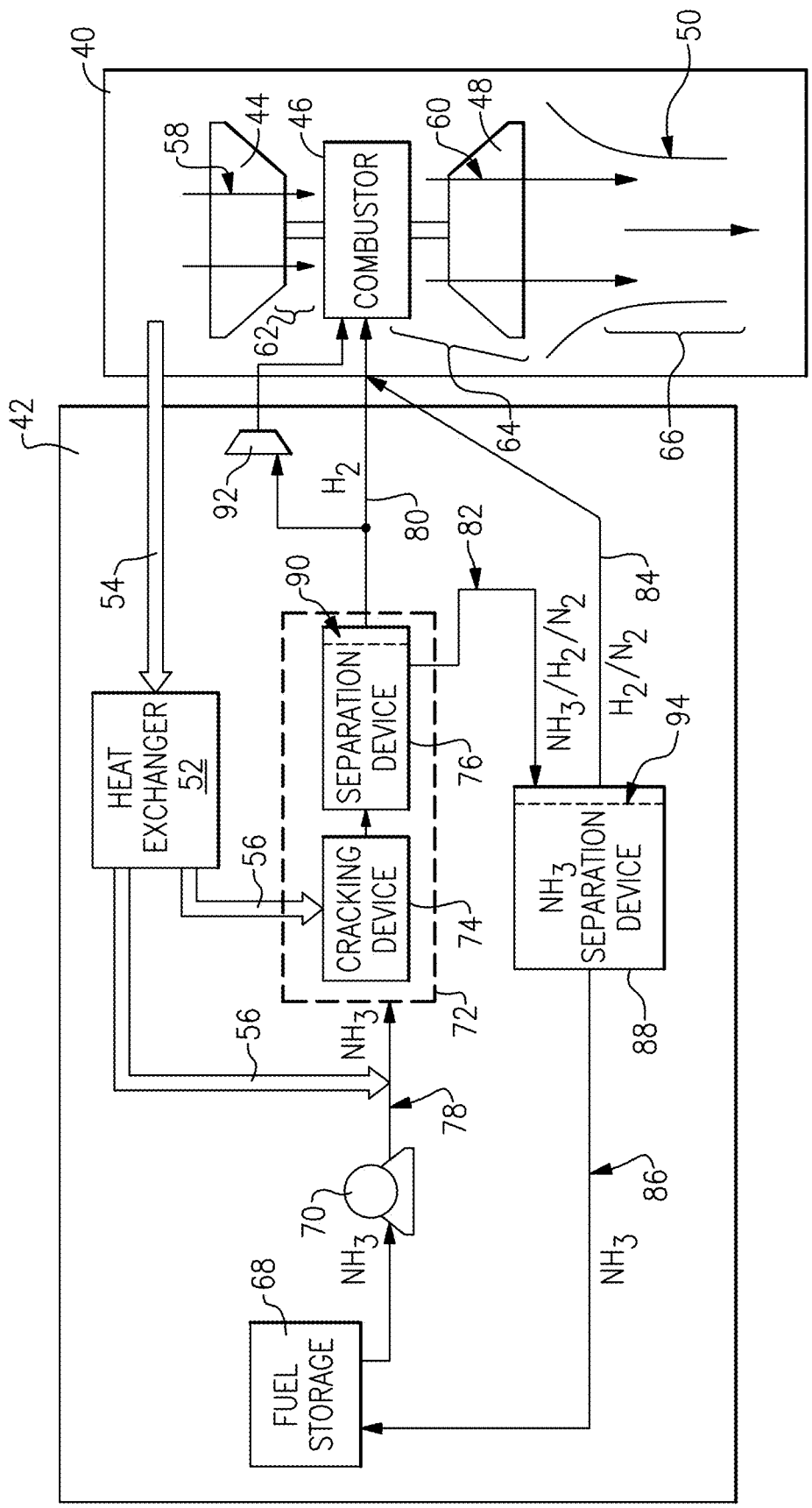
FIG. 1 is a schematic view of an example gas turbine engine embodiment.

FIG. 1 schematically illustrates an example alternate fueled turbine engine assembly 40. The engine assembly 40 uses a hydrogen ($H_2$) fuel flow 80 generated from decomposition of ammonia ($NH_3$). The hydrogen fuel flow 80 is mixed with a core gas flow 58 in a combustor 46 to generate a high energy gas flow 60 that expands through a turbine section 48 to drive a compressor section 44. It should be appreciated, that the engine 40 is shown schematically and that other structures and engine configurations such as 2-spool, 3-spool and geared turbofan engines would benefit from this disclosure and are within the contemplation and scope of this disclosure. Moreover, a land based turbine engine would also benefit from application of the features of this disclosure. The disclosed hydrogen fuel flow is generated by decomposition of ammonia ($NH_3$) provided by a decomposition assembly 72 of a fuel system 42.

Ammonia ($NH_3$) does not contain carbon, but does have a fuel energy similar to alcohols such as methanol. Ammonia can also be transported and stored in liquid form at moderate pressure and temperature. For example, ammonia is a liquid at a pressure of about 8.5 atm and a temperature of 20° C. Alternatively, ammonia is a liquid at a pressure of 1 atm and a temperature of −33° C. Moreover, because ammonia does not contain carbon it may be heated to temperatures above that of a hydrocarbon fuel without forming carbon deposits on portions of a fuel system. The increased temperature capabilities provide an increased heat sink capacity that can improve engine efficiency. Ammonia can be decomposed into hydrogen and nitrogen component parts. Hydrogen provides improved combustion properties and a desirable clean burning fuel that does not generate undesirable exhaust products. Additionally, conversion of the ammonia fuel to a hydrogen fuel can reduce nitrous oxide emissions by eliminating the presence of fuel-bound nitrogen atoms, which are inherent to ammonia as a fuel.

The disclosed fuel system 42 uses heat to decompose a flow of ammonia 78 into mostly component parts of hydrogen and nitrogen. The component parts of hydrogen and nitrogen are separated from any residual ammonia and communicated to the combustor 46 to produce the high energy gas flow 60 via combustion. The removal of ammonia from the fuel communicated to the combustor can help to reduce the formation of nitrogen oxide emissions. Moreover, the reduction of ammonia from the fuel communicated to the combustor maximizes the amount of hydrogen burned to improve combustion efficiency and flame holding stability.

The ammonia 78 is stored in a fuel storage tank 68 and pressurized by a fuel pump 70. The fuel pump 70 increases the pressure of the ammonia 78 to a higher level for communication into the combustor 46. The pressurized ammonia 78 is communicated to a decomposition assembly 72 that includes a cracker device 74 and a first separation device 76 for decomposition of the ammonia into the component parts of hydrogen and nitrogen. The decomposition process utilizes thermal energy indicated by arrows 56 that is obtained from heat sources and locations of the engine 40.

The pressure of the ammonia 78 can be adjusted depending on engine operating conditions and available thermal energy to provide desired combustor operation. In one disclosed embodiment, the ammonia 78 is pressurized to at least 5 atm (74 psi) at the cracker device 74. In another disclosed embodiment, the ammonia fuel is pressurized to between 5 atm (73 psi) and 300 atm (4410 psi) at the cracker device 74. The pressure of the ammonia fuel flow 78 may be more prior to entering the decomposition assembly 72 to accommodate pressure drops encountered within the cracker device 74 and separation device 76, or in other components between the cracker and the combustor. Moreover, the pressure within the decomposition assembly 72 may be higher or different to provide a desired final pressure of the component fuel flow 80 for communication into the combustor 46.

Figure 2:
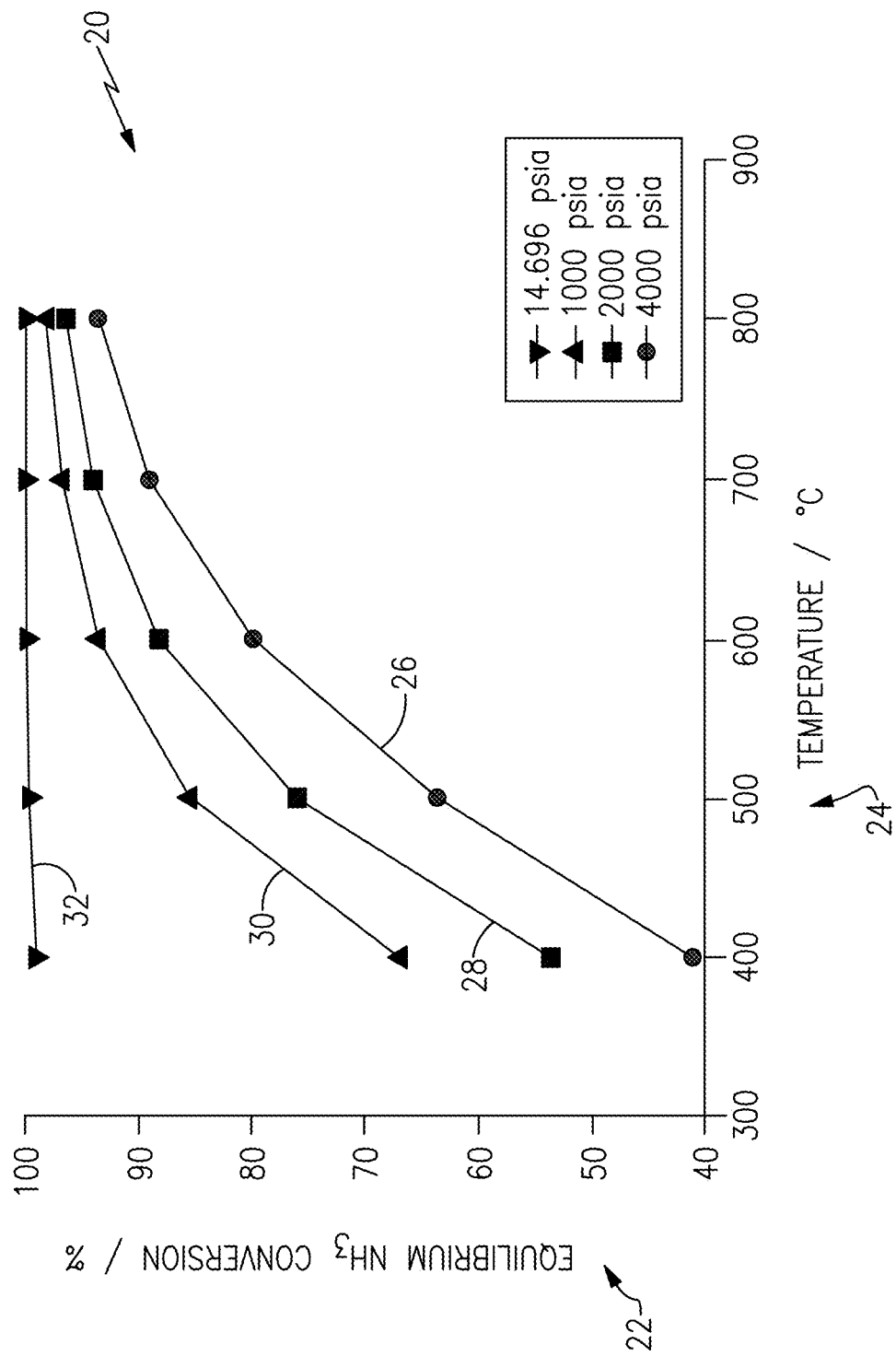
FIG. 2 is a graph illustrating a conversion percentage for a pressure or a temperature.

Referring to FIG. 2, with continued reference to FIG. 1, the decomposition or conversion process of ammonia into component parts of hydrogen and nitrogen is performed in the presence of a catalyst at a given pressure and temperature. The catalyst is typically a nickel, nickel alloy material, iron, or ruthenium, however other catalysts as are known are within the contemplation of this disclosure. The conversion process is limited by an equilibrium point based on pressure and temperature, and therefore some residual ammonia remains that is not decomposed. At very low pressures, a very high percentage of ammonia can be converted into hydrogen and nitrogen as indicated by line 32. The percentage of ammonia converted into component parts at pressures around 1 atm (14 psi) can approach 100% at temperatures above around 300° C. However, higher pressures are preferred to communicate the components of the fuel into the combustor 46.

The degree of conversion decreases as the pressure of the fuel flow increases as is shown by graph 20. At pressures of around 68 atm (1000 psi), the degree of conversion is reduced to below 70% at 400° C. as is indicated at 30. The degree of conversion at the same pressure increases with an increase in temperature. In this example, the conversion increases to over 80% at temperatures above around 500° C. Higher pressures require higher temperatures to achieve conversions above 80%. At a pressure of 136 atm (2000 psi), the temperature to achieve 80% conversion exceeds 500° C. as indicated by line 28. At a pressure of 272 atm (4000 psi)

the temperature to achieve 80% conversion exceeds 600° C. The lower conversions result in some quantity of residual ammonia that does not decompose and remains in the mixture downstream of the decomposition assembly 72. As decomposition progresses, the accumulation of hydrogen as a decomposition product slows the decomposition process until equilibrium is reached and decomposition stops; after this point decomposition can only proceed if hydrogen is removed from the mixture.

The example fuel system 42 uses thermal energy 56 from the engine 40 to elevate the temperature of the ammonia fuel flow in view of the pressure required to generate decomposition levels. Thermal energy is drawn from various heat sources including heat producing engine systems including hot air from after the last stage of the compressor section 44 as indicated at 62, heated cooling air exhausted from the combustor 46 and/or turbine as indicated at 64, and the high energy exhaust gas flow 60 flowing through the exhaust section or nozzle 50 as is schematically shown at 66. The heat drawn from the various heat sources is communicated to the cracker device 74 through a thermal transfer device 52 as is indicated by arrows 56.

In one example embodiment, the ammonia fuel flow 78 is elevated to a temperature above 500° C. (932° F.) before the decomposition assembly 72 or within the cracker device 74. In another disclosed embodiment, the ammonia fuel flow 78 is elevated to a temperature between 500° C. (932° F.) and 700° C. (1292° F.) before the decomposition assembly 72 or within the decomposition assembly 72. In still another disclosed embodiment, the ammonia fuel flow 78 is elevated to a temperature above 700° C. (1292° F.) before the decomposition assembly 72 or within the decomposition assembly 72. It should be understood that the above temperatures are provided as examples and that other temperature ranges could be utilized within the contemplation of this disclosure.

The decomposition of ammonia into its component part of hydrogen occurs according to the according to the chemical equation:

$$NH_3 \rightarrow \tfrac{1}{2}N_2 + 3(\tfrac{1}{2}H_2)$$

Depending upon the final temperature and pressure and the rate of decomposition in the presence of a catalyst, all of the ammonia or some portion of the ammonia may become cracked to form nitrogen and hydrogen. The cracking process is endothermic and therefore the cracked fuel has increased fuel chemical energy and can provide increased engine work output or thrust output without increased fuel flow and thereby improves engine fuel efficiency. The cracking process is endothermic and therefore additional heat absorption capacity becomes available at a given fuel temperature, thereby providing greater heat absorption before the fuel temperature approaches the temperature of the heat source.

The cracking process increases the number of moles, with one mole of ammonia $NH_3$ becoming two moles of cracked gas, per 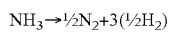 $NH_3 \rightarrow \tfrac{1}{2}N_2 + 3(\tfrac{1}{2}H_2)$, such that the resulting cracked gas occupies more volume than the ammonia alone. Some portion of ammonia is not cracked as is shown in the graph 20. The accumulation of hydrogen as a decomposition product can slow the decomposition reaction and limit the amount of hydrogen fuel produced. The example decomposition assembly 72 further includes the first separation device 76 that removes hydrogen from the residual ammonia, so the hydrogen can be used as a fuel that reduces or does not contain fuel-bound nitrogen and therefore provides lower NOx emissions. The first separation device 76 includes a hydrogen permeable membrane 90 that separates at least some hydrogen from the residual ammonia to create a hydrogen-rich permeate stream which when delivered to the combustor minimizes the amount of residual ammonia that is burned. The hydrogen permeable membrane 90 may be formed from Group V metals such as palladium, alloys of palladium with other metals such as silver or copper, or other materials with high permeability of hydrogen as compared to ammonia and nitrogen A flow of residual ammonia along with some quantity of nitrogen and hydrogen is exhausted from the first separation device 76 as a residual flow or retentate stream indicated at 82. The residual flow 82 is communicated to a second separation device 88 to separate any remaining ammonia from the component parts of hydrogen and nitrogen. The remaining hydrogen and nitrogen in the retentate stream from the second separation device 88 are communicated to the combustor 46 as indicated at 84, as a fuel mixture that reduces or does not contain fuel-bound nitrogen and therefore provides lower NOx emissions; this retentate stream can be mixed with the hydrogen-containing permeate stream from separation device 76 before delivery to the combustor, or it can be delivered directly to the combustor as an independent fuel stream. The separated ammonia indicated at 86 is returned to the fuel storage tank 68. The second separation device 88 includes an ammonia permeable membrane 94 that separates at least some of the residual ammonia from the residual flow 82 exhausted from the first separation device 76. The ammonia permeable membrane 94 may be formed from polymers, zeolites, or other materials with high permeability of ammonia as compared to hydrogen or nitrogen.

The hydrogen flow indicated at 80 from the separation device 76 is communicated to the combustor 46. The hydrogen flow 80 can proceed directly to the combustor 46 if the pressure is maintained at a level required for entering the combustor 46. However, if the hydrogen flow 80 is of a reduced pressure, all, or a portion of the hydrogen flow 80 may be pressurized by a compressor 92.

FIG. 1 illustrates the cracker device 74 and the first separation device 76 as distinct devices, however, the cracker device 74 and the first separation device 76 may be one single unit that integrates the cracking and separation processes. It is also possible to interleave the cracking and separation processes, or the cracking and separation devices by using multiple devices or units, to provide hydrogen separation before the completion of ammonia decomposition. When hydrogen separation occurs before the completion of ammonia decomposition, the accumulation of hydrogen during the decomposition process is reduced and further decomposition is promoted. As a result, the separation device 76 enhances decomposition by removing accumulating hydrogen and allowing a higher rate of decomposition and a higher degree of ammonia decomposition before the equilibrium limit is reached.

It should be appreciated, that the hydrogen flow 80 may include some residual portions of ammonia and nitrogen. However, a majority of the hydrogen flow 80 is comprised of hydrogen. Moreover, the residual flow 82 may include residual portions of hydrogen and nitrogen, together with the residual ammonia that remains after incomplete decomposition in the cracking device 72.

Figure 3:
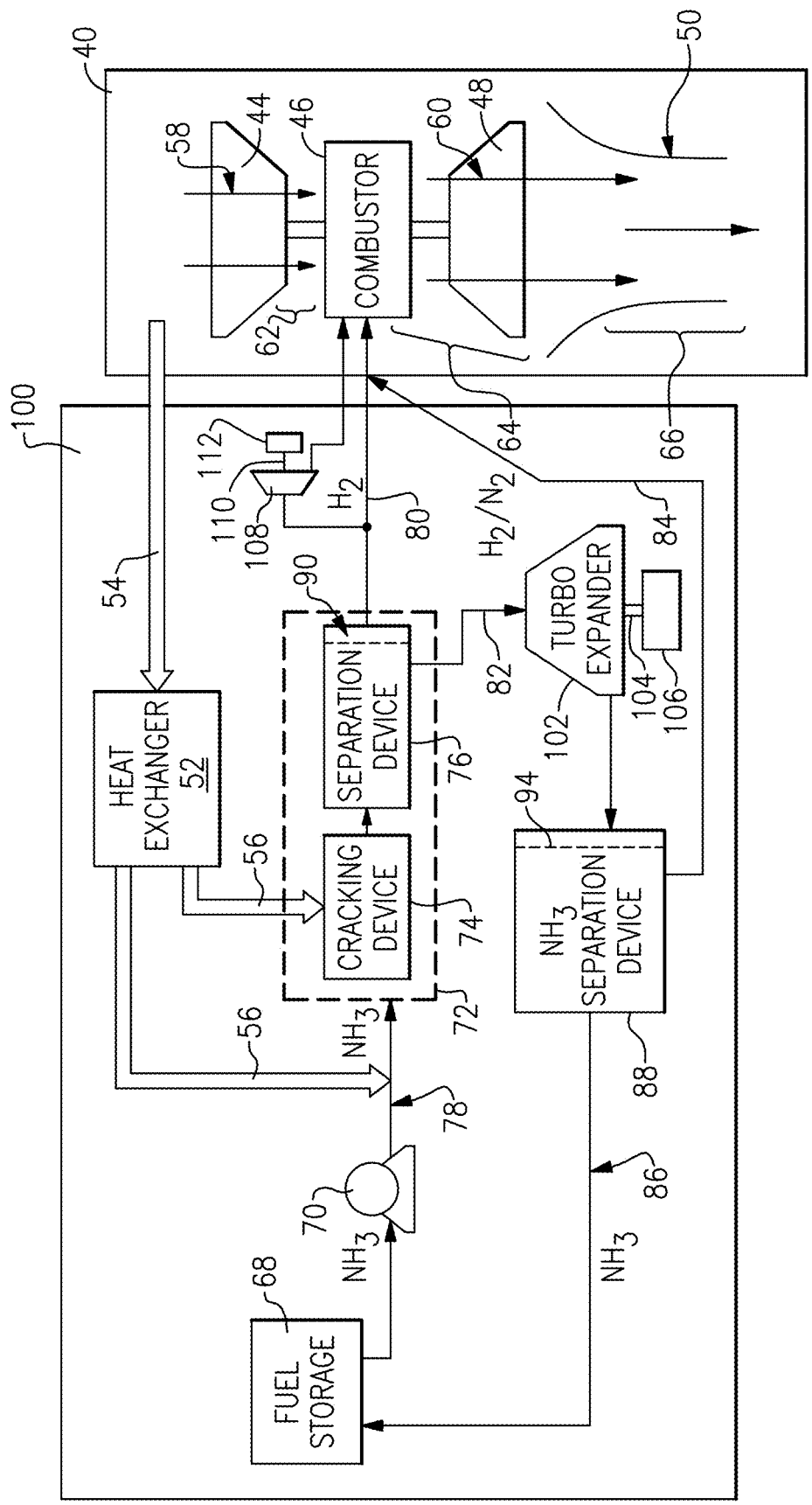
FIG. 3 is a schematic view of another example gas turbine engine embodiment.

Referring to FIG. 3 with continued reference to FIG. 2, another example fuel system 100 is shown and includes a turbo-expander 102 in communication with first separation device 76. The pressure of the residual flow 82 from the first separation device 76 is elevated to pressures required for communication of the hydrogen flow 80, which is the permeate stream from the first separation device 76, with the combustor 46. The higher pressure and temperatures of the residual flow 82, which is the retentate stream from the first separation device 76 and therefore at higher pressure than the permeate stream, are reclaimed through the turbo-expander 102. The residual flow 82 is communicated to the turbo-expander where it is expanded to drive a mechanical output 104. The mechanical output 104 in this example is a shaft that is coupled to drive an accessory device schematically shown at 106. The accessory device 106 in this example can be a pump, generator, or accessory drive gear train as well as any other system utilized to support operation of the engine 40 and/or aircraft.

The expanded residual flow comprising ammonia, nitrogen, and residual hydrogen, is exhausted from the turbo-expander 102 and communicated to the second separation device 88. The second separation device 88 includes an ammonia permeable membrane 94 that separates ammonia from hydrogen and nitrogen. The separated ammonia is returned to the fuel storage tank 68 and the hydrogen and nitrogen components are communicated to the combustor 46.

The elevated pressure and temperatures of the hydrogen fuel flow 80 may also be captured and utilized during operation where the flow 80 exceeds pressures required for communication into the combustor 46. In this example, a second turbo-expander 108 receives the hydrogen fuel flow 80 at an elevated pressure and temperature. The pressurized hydrogen flow 80 expands through the second turbo-expander 108 to drive an output 110. In this example, the output 110 is a shaft coupled to drive a device 112. The device 112 may be any accessory device utilized to support operation of the engine 40 and/or aircraft. Moreover, the turbo-expander 108 provides a drop in hydrogen fuel pressure for operational instances where little pressure drop is encountered through the decomposition assembly 72.

Accordingly, the disclosed assemblies provide for the advantageous use of ammonia fuel to improve engine efficiency and reduce carbon emission. The disclosed systems use advantageous properties of ammonia to maximize decomposition of ammonia into hydrogen fuel to reduce undesirable combustor emissions and improve engine efficiencies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fuel system for an aircraft propulsion system having a combustor configured to combust a fuel flow, the fuel system comprising:
   a fuel storage tank configured to store an ammonia fuel;
   an ammonia cracking device configured to decompose an ammonia flow into a flow containing more hydrogen ($H_2$) than ammonia ($NH_3$);
   a first separation device where a flow containing more hydrogen than ammonia is received from the ammonia cracking device, the first separation device is configured for separating hydrogen from residual ammonia and nitrogen, wherein residual ammonia is exhausted as a residual flow and a flow that contains more hydrogen than ammonia and nitrogen is exhausted separately as a hydrogen flow for communication to a combustor; and
   a second separation device downstream of the first separation device, the second separation device configured to receive the residual flow, separate ammonia from hydrogen and nitrogen, and communicate the hydrogen and nitrogen to the combustor.

2. The fuel system as recited in claim 1, wherein the ammonia cracking device and the first separation device are combined in one device.

3. The fuel system as recited in claim 1, wherein at least one of the first separation device and the second separation device comprise a selectively permeable membrane that is configured for separation of hydrogen from ammonia and nitrogen.

4. The fuel system as recited in claim 1, wherein the second separation device is further configured to communicate the separated ammonia to the fuel storage tank.

5. The fuel system as recited in claim 1, further comprising a turboexpander configured to receive the residual flow from the first separation device, wherein the residual flow is expanded through the turboexpander to drive a mechanical output.

6. The fuel system as recited in claim 5, wherein the second separation device is further configured to receive the residual flow exhausted from the turboexpander.

7. The fuel system as recited in claim 1, further comprising a pump configured to increase a pressure of the ammonia flow to a pressure above 1 atm (74 psi).

8. The fuel system as recited in claim 1, further comprising a heat exchanger configured to heat the ammonia flow to a temperature above 500° C. (932° F.).

9. The fuel system as recited in claim 1, further comprising a heat exchanger configured to heat the ammonia fuel flow for decomposition of the ammonia flow in the cracking device.

10. A method of operating a gas turbine engine, comprising:
    decomposing an ammonia fuel flow with an ammonia cracking device into a flow containing more hydrogen ($H_2$) than ammonia ($NH_3$);
    removing hydrogen downstream of the ammonia cracking device with a first separation device;
    communicating the flow containing more $H_2$ to a combustor configured to generate a gas flow; and
    removing ammonia from a residual flow exhausted from the first separation device in a second separation device, communicating separated ammonia from the residual flow to a fuel storage tank and communicating hydrogen and nitrogen from the residual flow to the combustor.

11. The method as recited in claim 10, further comprising heating the ammonia flow with thermal energy communicated from a heat source of the gas turbine engine with a thermal transfer device.

12. The method as recited in claim 11, further comprising expanding the residual flow from the first separation device using a turboexpander to drive a mechanical output.

13. The method as recited in claim 12, wherein the residual flow is communicated through the turboexpander before communication to the second separation device.

14. The method as recited in claim 10, increasing a pressure of the flow communicated from the first separation device to the combustor with a hydrogen compressor.

* * * * *